United States Patent
Walter et al.

(10) Patent No.: US 9,742,755 B2
(45) Date of Patent: *Aug. 22, 2017

(54) METHOD AND APPARATUS FOR AUTHENTICATING A COMMUNICATION DEVICE

(71) Applicant: AT&T Intellectual Property I, LP, Atlanta, GA (US)

(72) Inventors: Edward Walter, Boerne, TX (US); Larry B. Pearson, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/703,191

(22) Filed: May 4, 2015

(65) Prior Publication Data
US 2015/0237032 A1 Aug. 20, 2015

Related U.S. Application Data

(63) Continuation of application No. 11/677,553, filed on Feb. 21, 2007, now Pat. No. 9,053,063.

(51) Int. Cl.
*H04L 29/06* (2006.01)

(52) U.S. Cl.
CPC .......... *H04L 63/08* (2013.01); *H04L 65/1069* (2013.01); *H04L 65/1073* (2013.01)

(58) Field of Classification Search
None
See application file for complete search history.

(56) References Cited

U.S. PATENT DOCUMENTS

| | | | |
|---|---|---|---|
| 2,423,221 A | 7/1947 | Berkman | |
| 6,046,162 A | 4/2000 | Ruoslahti et al. | |
| 6,574,798 B1 * | 6/2003 | Bradley | H04N 7/165 340/4.37 |
| 6,782,080 B2 | 8/2004 | Leivo et al. | |
| 2001/0012775 A1 * | 8/2001 | Modzelesky | H04B 7/18539 455/427 |
| 2002/0105929 A1 | 8/2002 | Chen et al. | |

(Continued)

*Primary Examiner* — Farid Homayounmehr
*Assistant Examiner* — Olanrewaju Bucknor
(74) *Attorney, Agent, or Firm* — Guntin & Gust, PLC; Joseph Hrutka

(57) ABSTRACT

A method and apparatus for authenticating a communication device is disclosed. An system that incorporates teachings of the present disclosure may include, for example, an authentication system having a controller element that receives from a communication device over a packet-switched network a terminal ID and a request to authenticate said communication device, generates a first registration ID, stores the first registration ID and a first communication identifier, transmits the first registration ID to the communication device, receives from an interactive response system a second communication identifier and a second registration ID that the interactive response system received during a communication session with the communication device over a circuit-switched network, and authenticates the communication device in response to detecting a match between the first and second communication identifiers and the first and second registration IDs. Additional embodiments are disclosed.

18 Claims, 3 Drawing Sheets

(56) References Cited

U.S. PATENT DOCUMENTS

| | | | |
|---|---|---|---|
| 2002/0105939 A1* | 8/2002 | Vassilovski | H04W 76/04 370/349 |
| 2003/0128822 A1* | 7/2003 | Leivo | G06F 21/42 379/93.02 |
| 2003/0198198 A1* | 10/2003 | Echavarri | H04W 88/021 370/328 |
| 2004/0180646 A1* | 9/2004 | Donley | H04M 1/66 455/411 |
| 2004/0236939 A1* | 11/2004 | Watanabe | H04L 63/0428 713/150 |
| 2005/0025124 A1* | 2/2005 | Mitsumori | H04L 12/2602 370/352 |
| 2006/0029190 A1 | 2/2006 | Schultz et al. | |
| 2006/0168162 A1 | 7/2006 | Woundy et al. | |
| 2006/0209795 A1* | 9/2006 | Chow | H04L 12/2801 370/352 |
| 2006/0268715 A1 | 11/2006 | Zuniga et al. | |
| 2007/0044141 A1 | 2/2007 | Lor et al. | |
| 2007/0195825 A1* | 8/2007 | Wang | H04K 1/00 370/493 |
| 2007/0256120 A1* | 11/2007 | Shatzkamer | H04L 63/08 726/5 |
| 2008/0037501 A1* | 2/2008 | Ali | H04W 36/12 370/342 |
| 2008/0076386 A1* | 3/2008 | Khetawat | H04M 3/16 455/410 |
| 2008/0092212 A1* | 4/2008 | Patel | H04L 12/66 726/3 |
| 2008/0126351 A1 | 5/2008 | Freeman et al. | |
| 2009/0323673 A1* | 12/2009 | Gabbay | H04M 1/2535 370/352 |

* cited by examiner

METHOD AND APPARATUS FOR AUTHENTICATING A COMMUNICATION DEVICE

CROSS-REFERENCE TO RELATED APPLICATION(S)

This application is a continuation of U.S. patent application Ser. No. 11/677,553 filed Feb. 21, 2007 by Walter et al., entitled "Method and Apparatus for Authenticating a Communication Device." All sections of the aforementioned application are incorporated herein by reference in its entirety.

FIELD OF THE DISCLOSURE

The present disclosure relates generally to authentication techniques, and more specifically to a method and apparatus for authenticating a communication device.

BACKGROUND

Identity theft over the Internet has been and continues to be an issue faced by service providers and its subscribers. As common communication devices such as house or office phones migrate to the Internet for data as well as voice communications, a risk arises that private information associated with these communication devices (e.g., a Media Access Control address, serial number, etc.) can be stolen and used to program counterfeit devices to access communication services of subscribers without authorization.

A need therefore arises for a method and apparatus for authenticating a communication device.

DETAILED DESCRIPTION OF THE DRAWINGS

Figure 1:
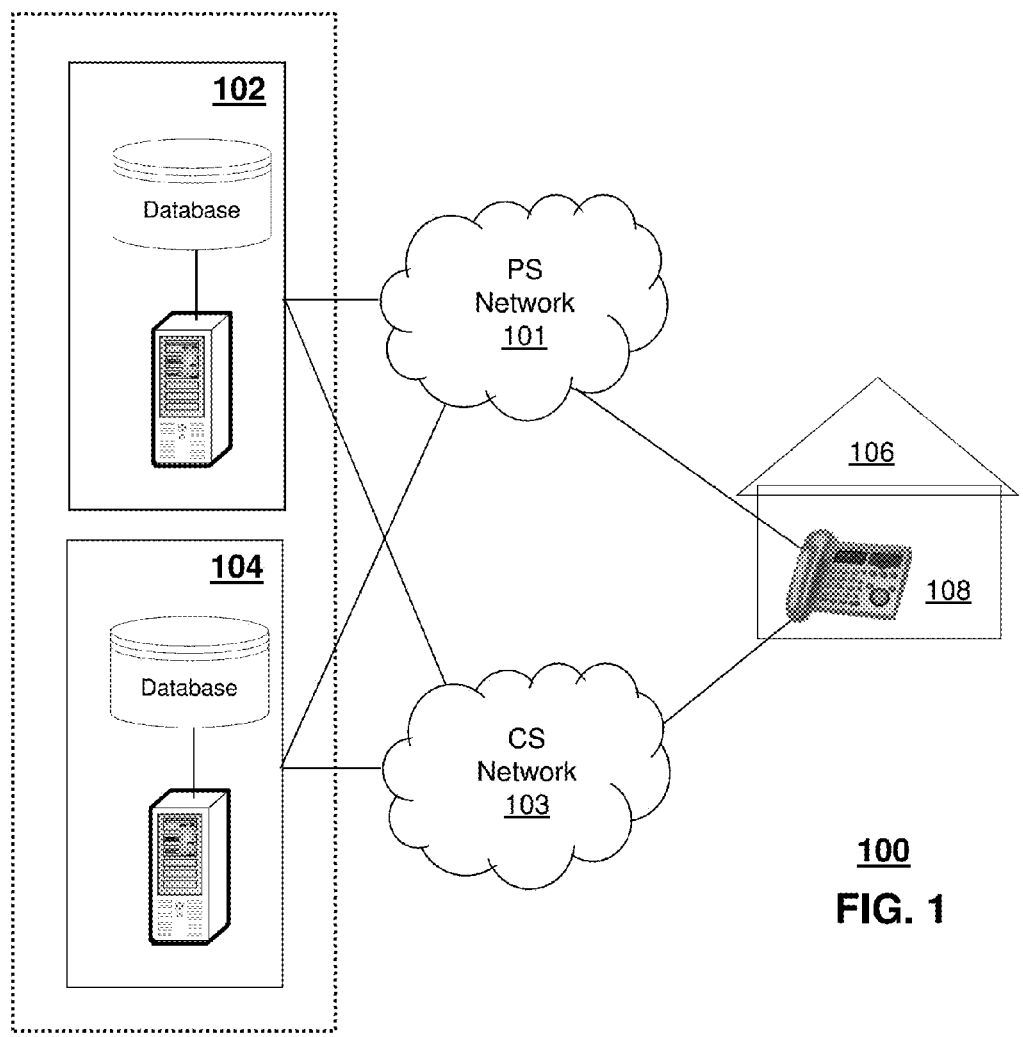
FIG. 1 depicts an exemplary embodiment of a communication system for authenticating a communication device.

Embodiments in accordance with the present disclosure provide a method and apparatus for authenticating a communication device.

In a first embodiment of the present disclosure, an authentication system can have a controller element that receives from a communication device over a packet-switched network a terminal ID and a request to authenticate said communication device, generates a first registration ID responsive to the request, stores the first registration ID and a first communication identifier, transmits the first registration ID to the communication device, receives from an interactive response system a second communication identifier and a second registration ID that the interactive response system received during a communication session with the communication device over a circuit-switched network, and authenticates the communication device in response to detecting a match between the first and second communication identifiers and the first and second registration IDs.

In a second embodiment of the present disclosure, a computer-readable storage medium in an interactive response system can have computer instructions for receiving from a communication device over a circuit-switched network a first registration ID that was supplied to the communication device over a packet-switched network by an authentication system, retrieving from signaling information of the circuit-switched network a first communication identifier associated with the communication device, and submitting the first communication identifier and the first registration ID to the authentication system for authenticating the communication device in response to detecting a match between the first communication identifier and the first registration ID and a second communication identifier and a second registration ID stored in the authentication system.

In a third embodiment of the present disclosure, a communication device can have a controller element that transmits to an authentication system over a packet-switched network a terminal ID and a request to authenticate said communication device, receives from the authentication system a first registration ID, and transmits to an interactive response system over a circuit-switched network the first registration ID. The interactive response system can retrieve from signaling information of the circuit-switched network a first communication identifier associated with the communication device, and submit the first communication identifier and the first registration ID to the authentication system for authenticating the communication device in response to detecting a match between the first communication identifier and the first registration ID and a second communication identifier and a second registration ID stored in the authentication system.

In a third embodiment of the present disclosure, a method can involve authenticating a communication device by collectively processing one or more authentication steps in a packet-switched network and one or more authentication steps in a circuit-switched network.

FIG. 1 depicts an exemplary embodiment of a communication system 100 for authenticating a communication device 108. The communication system 100 can comprise a Packet-Switched (PS) network 101, a Circuit-Switched (CS) network 103, an authentication system 102 and interactive response system 104. The PS network 101 can comprise a number of common network elements (e.g., routers) that transport packetized messages between end points of the communication system. The PS network 101 can operate according to any number of communication protocols including without limitation an Internet Protocol (IP), Multi-Protocol Label Switching (MPLS), Asynchronous Transfer Mode/Frame Relay (ATM/FR), and combinations thereof. The CS network 103 can comprise common circuit-switched network elements that operate as a Public Switched Telephone Network (PSTN) for transporting digitized messages between end points of the communication system 100.

The authentication system 102 can utilize common computing, communications, and mass storage media technologies (such as found in a server or mainframe computer) to perform tasks associated with authenticating the communication device 108 by way of the communication system 100. The authentication process can be used as a deterrent to counterfeiters attempting to gain access to services of the communication system 100 by way of counterfeit communication devices.

The interactive response system 104 also utilizes common computing, communications, and mass storage media technologies and operates with the authentication system 102 to perform the authentication process. The interactive response system 104 can communicate with the communication device 108 over the CS network 103 and process Dual Tone Multi-Frequency (DTMF) signals generated by the communication device 108. The interactive response system 104 can represent a common Interactive Voice Response (IVR) system or other suitable processing technology.

Communications between the authentication system 102 and interactive response system 104 can take place over the PS or CS networks 101, 103. Alternatively, said systems 102-104 can be integrated in which case they would be logical units operating in one computing platform utilizing the resources available to them to communicate with the communication device over the PS and CS networks 101, 103.

Figure 2:
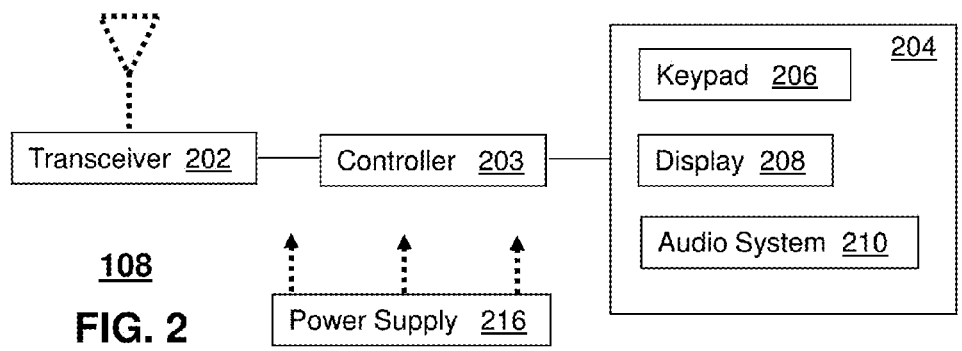
FIG. 2 depicts an exemplary embodiment of the communication device operating in the communication system.

The communication device 108 can be embodied in any device occupied in a building (commercial or residential) 106 that communicates over the PS and CS networks 101, 103 by way of packet-switched and circuit-switched communication interfaces integrated therein. FIG. 2 depicts an exemplary embodiment of the communication device 108. The communication device 108 can comprise a wireless or wireline transceiver 202, a user interface (UI) 204, a power supply 216, and a controller 203 for managing operations of the foregoing components.

The transceiver 202 utilizes common circuit-switched and packet-switched communication technologies. Wireline access technologies used by the transceiver 202 can include, for example, cable, xDSL, Public Switched Telephone Network (PSTN), and so on. Singly or in combination with the wireline technology, the transceiver 202 can support singly or in combination any number of wireless access technologies including without limitation Digital Enhance Cordless Telecommunications (DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing public and private communication spectrum with any number of communication protocols that can be dynamically downloaded over-the-air to the communication device 108. Next generation wireline and wireless access technologies can also be applied to the operations of the transceiver 202.

The UI element 204 can include a keypad 206 with depressible or touch sensitive keys and a navigation element such as a navigation disk, button, roller ball, or flywheel for manipulating operations of the communication device 108. The UI element 204 can further include a display 208 such as monochrome or color LCD (Liquid Crystal Display) which can be touch sensitive for manipulating operations of the communication device 108 and for conveying images to the end user of said device, and an audio system 210 that utilizes common audio technology for conveying and intercepting audible signals of the end user.

The power supply 216 can utilize common power management technologies such as replaceable batteries, supply regulation technologies, and charging system technologies for supplying energy to the components of the communication device 108 and to facilitate portable applications. Depending on the type of power supply 216 used, the communication device 108 can represent an immobile or portable communication device. The controller 203 can utilize computing technologies such as a microprocessor and/or digital signal processor (DSP) with associated storage memory such a Flash, ROM, RAM, SRAM, DRAM or other like technologies for controlling operations of the communication device 108.

The communication device 108 can represent a single operational device or a family of devices configured in a master-slave arrangement. In the latter embodiment, the components of the communication device 108 can be reused in different form factors for the master and slave terminal devices 100. The communication device 108 can also be represented by any number of communication devices including without limitation a laptop computer, a desktop computer, a cell phone, a personal digital assistant, a set-top-box (STB), or a cordless phone just to name a few. An end user can also utilize more than one type of communication device 108 and migrate between communication devices when desired. Additionally, each of the communication devices 108 can be addressed by one or more communication identifiers for establishing real-time (e.g., voice) and/or non-real time communications (e.g., text or recorded speech).

Figure 3:
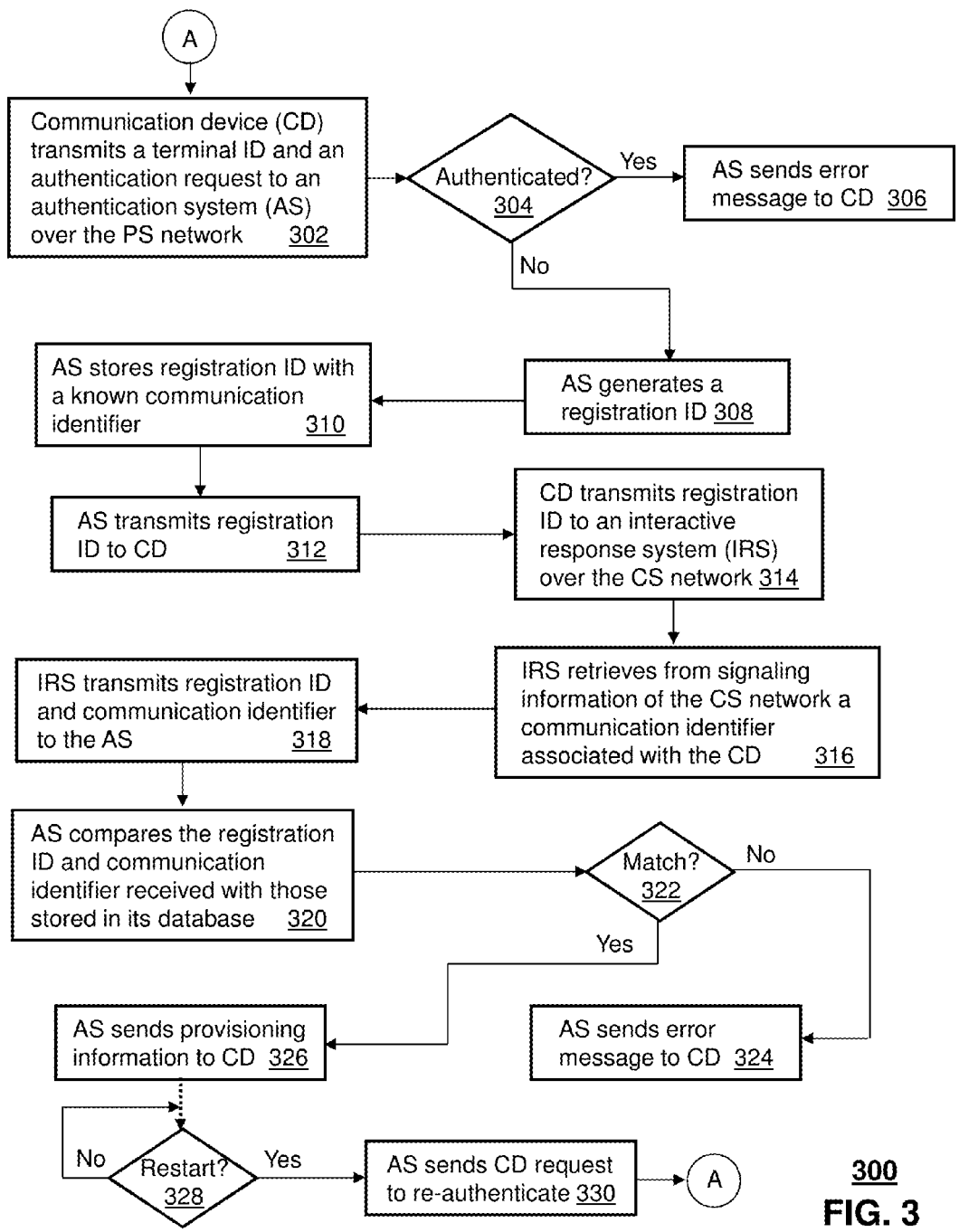
FIG. 3 depicts an exemplary method operating in portions of the communication system.

FIG. 3 depicts an exemplary method 300 operating in portions of the communication system 100. Method 300 begins with step 302 in which a communication device 108 transmits a terminal ID and an associated authentication request to the authentication system 102 over the PS network 101. Step 302 can occur, for example, each time the communication device power cycles, at periodic intervals as directed by the authentication system 102, or as an autonomous function of the communication device 108. The terminal ID can comprise any suitable form of identification such as, for example, a Media Access Control (MAC) address of the communication device 108 or a MAC address of a residential gateway in the building 106.

In step 304, the authentication system 102 can be programmed to search through a database managed thereby using the terminal ID as an index therein to determine if the communication device 102 has previously been authenticated and re-authentication is not required. If the communication device 108 has been previously authenticated and re-authentication is not required, the authentication system 102 proceeds to step 306 where it submits an error message to the communication device 108 indicating that the request is erroneous. If, on the other hand, the communication device 108 has not been previously authenticated or requires re-authentication, the authentication system 102 proceeds to step 308 where it generates a registration ID.

The registration ID can be a random number generated using common techniques. For instance, the terminal ID can be used as a seed for generating the random number from a common random number generation method. Alternatively, the registration ID can represent any arbitrary number that can be hard to guess. Thus, the registration ID does not have to be limited to random numbers. It can be generated by hashing algorithms (such as Message Digest 5 or MD5; or a Secure Hash Algorithm or SHA). The MAC address of the communication device 108 along with an encryption key can be supplied to a one-way hash to generate an undistinguishable string of characters.

From the foregoing techniques it would be evident to one of ordinary skill in the art that the registration ID can be represented by any common or future coding scheme suitable for identification purposes.

In step 310, the authentication system 102 can store (for later use in the authentication process) the registration ID with a communication identifier associated with communication services supplied to the building 106. The communication identifier can conform to an E.164 International Telecommunications Union (ITU) standard for common PSTN applications. Alternatively, in an embodiment where the communication system 100 in whole or in part operates according to an IP Multimedia Subsystem (IMS) standard, the communication identifier of the communication device 108 can be represented by a Session Initiation Protocol Uniform Resource Identifier (SIP URI) or a Telephone (Tel) URI. The communication identifier can be programmed into the authentication system 102 at a time when an end user subscribes to communication services of the communication system 100 for a communication link in the building 106.

In step 312, the authentication system 102 can be programmed to transmit the registration ID to the communication device 108. In this step, a communication identifier (e.g., an 800 number) of the interactive response system 104 can also be transmitted if not already preprogrammed in the communication device 108. The communication device 108 in response establishes communications over the CS network 103 using the communication identifier of the interactive response system 102 and transmits in step 314 the registration ID to the interactive response system utilizing DTMF tones.

Alternatively, the registration ID transmitted in step 314 can represent a sound-based transmission. For example, DTMF tones can be used to create tonal combinations supporting HEX or binary encoding. In addition, one could use a modem to transmit more traditional data in which case the interactive response system 104 can be supplemented with a modem interface. If the interactive response system 104 supports speech recognition, the communication device 108 can also generate synthesized speech to relay the registration ID.

From the aforementioned transmission techniques it would be evident to one of ordinary skill in the art that any transmission method used over the CS network 103 can be utilized to convey the registration ID.

In step 316, the interactive response system 104 retrieves from signaling information of the CS network 103 using common techniques a communication identifier associated with the communication device 108 (e.g., caller ID retrieved from an automatic number identification feature). In step 318, the interactive response system 104 transmits to the authentication system 102 the registration ID (e.g., the random number) and the communication identifier (caller ID) of the communication device 108 collected in step 316. The transmission of step 318 can take place over the PS or CS networks 101, 103.

The authentication system 102 in step 320 compares the registration ID and the communication identifier supplied by the interactive response system 102 to those stored in its database which can be indexed by the communication identifier supplied in step 318. If a match is not found, the authentication system 102 proceeds to step 324 where it submits an error message to the communication device 108 indicating, for example, that the authentication process has failed.

If on the other hand a match is found, the authentication system 102 proceeds to step 326 where it transmits to the communication device 108 provisioning information. The provisioning information can include among other things the communication identifier of the communication device 108 (if not already known by said device) and a dial plan that provides an instruction guide to communications services subscribed by the end user residing in the building 106. The dial plan can provide the communication device 108 for instance dialing instructions for 7, 10 or 11 digit dialing for the services supplied to building 106. In an embodiment in which the communication system 100 supports IMS services, the dial plan can represent an instructional guide for the communication device 108 corresponding to communication operations for said system.

As a supplemental embodiment, the authentication system 102 can be programmed to request that the communication device 108 re-authenticate on a periodic basis to reduce the likelihood of unauthorized usage of the communication system 100 by counterfeit communication devices. For example, in step 328 the authentication system 102 can be programmed to monitor restart times for submitting re-authentication requests to communication devices 108 (e.g., once per hour, once per day, once per week, etc.). When the restart time is triggered, the authentication system 102 proceeds to step 330 where it transmits a re-authentication request to the communication device 108. This prompts the communication device 108 to repeat method 300. Alternatively, the communication device 108 can be programmed to re-authenticate on its own. In this embodiment, step 304 can be modified to recognize a need for re-authentication at periodic intervals in which case step 306 would not occur unless the re-authentication request submitted by the communication device 108 is too early.

It is unlikely that a counterfeit communication device can gain access to communication link closest to a building 106 housing a legitimate communication device 108. It follows that a counterfeit communication device communicating over the CS network 103 while outside the reach of building 106 will not share the same communication identifier (caller ID) as a communication device 108 in the building. Consequently, a proper communication identifier cannot be supplied to the interactive response system 104 in step 316, which inevitably leads to an authentication failure in step 322. Utilizing the exemplary two factor registration technique of method 300, a service provider can prevent unauthorized access to the communication system 100 and therefore protect its subscribers from an unsuspected theft of the terminal ID of the communication device 108.

Upon reviewing the embodiments disclosed, it would be evident to an artisan with ordinary skill in the art that said embodiments can be modified, reduced, or enhanced without departing from the scope and spirit of the claims described below. Accordingly, the reader is directed to the claims section for a fuller understanding of the breadth and scope of the present disclosure.

Figure 4:
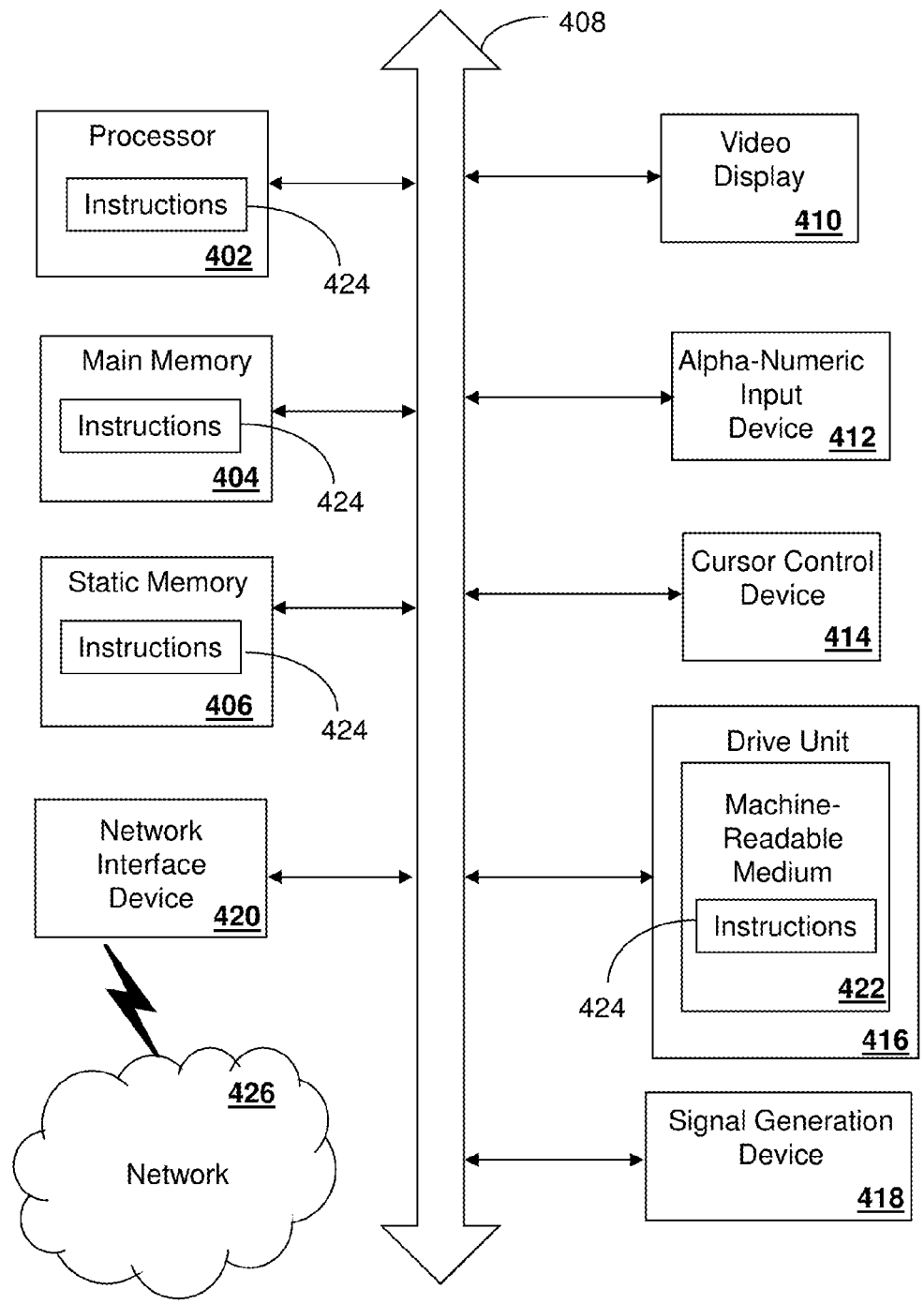
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 47 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An authentication system, comprising:
a processing system including a processor; and
a memory that stores executable instructions that, when executed by the processing system, facilitate performance of operations, comprising:
receiving, from a communication device over a packet-switched network, a terminal identification for the communication device and a request to authenticate the communication device, wherein the terminal identification for the communication device comprises a media access control address of a residential gateway utilized by the communication device for providing communication services;
generating a first registration identification responsive to the request to authenticate, wherein the generating of the first registration identification comprises providing an authentication key and the media access control address of the residential gateway to a hash algorithm for generating a string of characters as the first registration identification;
determining if the first registration identification has been previously stored;
responsive to determining that the first registration identification has not been previously stored:
storing the first registration identification and a first communication identifier;
transmitting the first registration identification to the communication device;
receiving a second communication identifier and a second registration identification from an interactive response system that the interactive response system received during a communication session with the communication device over a circuit-switched network, wherein the second communication identifier is associated with the communication device;
authenticating the communication device in response to detecting a match between the first and second communication identifiers and the first and second registration identifications; and
transmitting provisioning information to the communication device for establishing communications therewith over the circuit-switched network in response to a successful authentication step,
wherein the provisioning information comprises a dial plan for the communication services subscribed to by an end user of the communication device.

2. The authentication system of claim 1, wherein the transmitting the first registration identification further comprises transmitting a third communication identifier associated with the interactive response system.

3. The authentication system of claim 1, wherein, responsive to determining that the first registration identification has been previously stored, returning an error message to the communications device.

4. The authentication system of claim 1, wherein the first communication identifier comprises one of a session initiation protocol uniform resource identifier and a telephone uniform resource identifier, and wherein the receiving of the request to authenticate is according to a periodic interval managed by the processor.

5. The authentication system of claim 1, wherein operations further comprise periodically transmitting a request to the communication device for re-authentication that is based in part on the first communication identifier.

6. The authentication system of claim 1, wherein the first communication identifier is associated with a subscription for the communication services provided to a physical location of the communication device via the residential gateway.

7. The authentication system of claim 6, wherein the first communication identifier is provided to the authentication system in temporal proximity to the subscription for the communication services being established.

8. The authentication system of claim 1, wherein the interactive response system comprises an interactive voice response system,
wherein the circuit-switched network operates according to a public switched telephone network, and
wherein the packet-switched network operates according to an Internet protocol standard.

9. A non-transitory machine-readable medium, comprising executable instructions that, when executed by a processing system including a processor, facilitate performance of operations, comprising:
receiving a first registration identification from a communication device over a circuit-switched network that was supplied to the communication device over a packet-switched network by an authentication system, wherein the first registration identification is generated according an application of a hash algorithm to an authentication key and a media access control address of a residential gateway that provides communications services to the communication device;
retrieving a first communication identifier from signaling information of the circuit-switched network associated with the communication device;
sending the first communication identifier to the authentication system for storage;
receiving an indication that if-the first registration identification has been or has not been previously stored at the authentication system;
responsive to receiving the indication that the first registration identification has not been previously stored:
receiving an indication of a match between the first communication identifier and the first registration identification and another match between a second communication identifier and a second registration identification stored in the authentication system;
submitting the first communication identifier and the first registration identification to the authentication system for authenticating the communication device in response to receiving the indication; and
transmitting the first registration identification and a third communication identifier associated with an interactive response system for establishing communications therewith over the circuit-switched network,
wherein the first communication identifier is associated with a subscription for communication services provided to a physical location where the communication device connects with the circuit-switched and packet-switched networks.

10. The non-transitory machine-readable storage medium of claim 9, comprising computer instructions for:

receiving, from the communication device, dual tone multi-frequency signals; and retrieving the first registration identification from the dual tone multi-frequency signals.

11. The non-transitory machine-readable storage medium of claim 9, wherein the residential gateway generates a string of characters as the first registration identification.

12. The non-transitory machine-readable storage medium of claim 11, wherein the hash algorithm comprises a message digest algorithm.

13. The non-transitory machine-readable storage medium of claim 9, wherein the first and second communication identifiers comprise one among a session initiation protocol uniform resource identifier or a telephone uniform resource identifier.

14. The non-transitory machine-readable storage medium of claim 9, wherein, responsive to determining that the first registration identification has been previously stored, the authentication system returns an error message to the communications device.

15. A communication device, comprising:

a processing system including a processor; and a memory that stores executable instructions that, when executed by the processing system, facilitate performance of operations, comprising:

transmitting to an authentication server over a packet-switched network a terminal identification and a request to authenticate the communication device, wherein the terminal identification for the communication device comprises a media access control address of a residential gateway utilized by the communication device for providing communication services;

receiving from the authentication server a first registration identification responsive to the request to authenticate, wherein the first registration identification is generated by the authentication server by providing an authentication key and the media access control address of the residential gateway to a hash algorithm for generating a string of characters as the first registration identification; and transmitting to an interactive response server over a circuit-switched network the first registration identification, wherein the interactive response server:

retrieving from signaling information of the circuit-switched network a first communication identifier associated with the communication device;

receiving an indication of a match between the first communication identifier and the first registration identification and a second communication identifier and a second registration identification stored in the authentication server; and submitting the first communication identifier and the first registration identification to the authentication server for authenticating the communication device in response to receiving the indication, wherein the first communication identifier is associated with a subscription for communication services provided to a physical location where the communication device connects with the circuit-switched and packet-switched networks; and transmitting provisioning information to the communication device in response to a successful authentication step, wherein the provisioning information comprises a dial plan for the communication services subscribed to by an end user of the communication device.

16. The communication device of claim 15, wherein the authentication server stores the terminal identification and returns an error message if the terminal identification was previously stored therein.

17. The communication device of claim 16, wherein the first communication identifier conforms to an E.164 International Telecommunications Union standard, and wherein the operations further comprise receiving, from the authentication server, provisioning information in response to a successful authentication, wherein the provisioning information comprises the first communication identifier of the communication device and a dial plan for communication services subscribed by an end user of the communication device.

18. The communication device of claim 15, wherein the operations further comprise transmitting the first registration identification and a third communication identifier associated with the interactive response server for establishing communications therewith over the circuit-switched network.

* * * * *